Patented Apr. 27, 1954

2,676,881

UNITED STATES PATENT OFFICE 2,676,881

HERBICIDAL COMPOSITIONS

George E. Bennett, Dayton, Ohio, assignor to Monsanto Chemical Company, St. Louis, Mo., a corporation of Delaware No Drawing. Application January 19, 1953, Serial No. 332,085

10 Claims. (Cl. 71—2.3)

The present invention provides new and valuable compositions possessing highly selective herbicidal efficacy and methods of destroying or preventing plant growth in which such compositions are used.

I have found that improved, very efficient, selective herbicidal compositions are obtained when there are prepared oil-in-water emulsions of a ketone selected from the class consisting of 2-(1-cyclohexenyl) cyclohexanone and 2-cyclohexylidenecyclohexanone and mixtures of the same. The useful ketones are known compounds which are obtainable by a variety of syntheses, e. g., a mixture of the two isomers comprising mainly the cyclohexenylcyclohexanone may be prepared by the acid- or alkali-catalyzed condensation of cyclohexanone, and the individual ketones separated from each other by known isolating procedures. Either the isolated ketones or a mixture of the two isomers in any proportion may be employed as the herbicidally active component of the present compositions.

The present compositions are characterized by a high degree of selective efficacy in that even in very low concentration, e. g., in a concentration of as low as 0.1 per cent, they are extremely injurious to narrow-leafed plant growth but have no adverse effect on broad-leafed plants at the same concentration. They may thus be employed very advantageously for ridding truck crop fields, e. g., strawberries, beans, etc. of invading grasses such as cheat grass.

Herbicidal compositions containing the present ketones are readily obtained by first preparing a solution thereof in an organic solvent and then adding the resulting solution to water containing an emulsifying agent to form an emulsion. Because of the very high herbicidal efficiency of the ketones, they are present in the herbicidal composition in only very small concentrations, for example, in concentrations of from 0.1 per cent to 2 per cent by weight of the total weight of the emulsion. Emulsifying agents which may be employed are those customarily used in the art for the preparation of oil-in-water emulsions. Since the present ketones are highly stable compounds of little chemical reactivity, they are not affected by either ionic or nonionic emulsifying agents. Examples of emulsifying agents which may be used include alkylbenzenesulfonates, long chained polyalkylene glycols, long chained succinates, etc. The emulsions may be used to destroy already existing plant growth by direct application to the undesirable plants, e. g., by spraying; or the emulsions may be employed to prevent plant growth by application to media which normally support plant growth. When employed to prevent plant growth, for example in parking areas, highway abutments, railway yards, etc., the emulsions may be applied by spraying only the surface of said media or they may be admixed with said media. Generally, spraying of only the soil surface is sufficient to prevent plant growth in areas which are to be kept clear of plants. However, the emulsions may be incorporated into customarily employed temporary surfacing materials, e. g., oils, cinders, etc.

The present invention is further illustrated, but not limited, by the following examples:

*Example 1*

Spray testing of the present herbicidal compositions was conducted as follows:

A cyclohexanone solution of an emulsifying agent and a mixture of 2-(1-cyclohexenyl) cyclohexanone and 2-cyclohexylidenecyclohexanone B. P. 149–151° C./20 mm., consisting predominantly of the former, and obtained by the acid-catalyzed self-condensation of cyclohexanone, were added to water, the quantity of solution employed being calculated to give emulsions containing 1.0 per cent, 0.3 per cent and 0.1 per cent by weight, respectively, of said mixture, based on the weight of the total emulsion. Said emulsifying agent comprised a mixture of a polyalkyleneglycol derivative and an alkylbenzenesulfonate.

Three week old corn and bean plants were sprayed with the respective emulsions, two plants of each variety being employed. The spraying was continued until droplets formed on and/or fell from the foliage and stems of the sprayed plants, up to 15 ml. of the emulsion being applied to each plant. The sprayed plants as well as two untreated "blank specimens" of each plant were then allowed to remain under standard conditions of sunlight and watering for a period of one week. At the end of that time the sprayed plants were compared with the untreated plants in order to determine the extent of injury, if any. Corn plants which had been treated with the 1 per cent, 0.3 per cent and 0.1 per cent emulsions were dead and the leaves thereof dried, whereas the bean plants were only slightly affected at the 1 per cent and 0.3 per cent concentrations and not at all at the 0.1 per cent concentration.

For purposes of comparison, cyclohexanone, employed as the solvent in the above test, as well as a number of other hydroaromatic ketones, were submitted to the spray test by the procedure used to test the above mixture of 2-(1-cyclohexenyl)cyclohexanone and 2-cyclohexylidenecyclohexanone. The following results were obtained:

| Compound Tested at Percent Concentration | Extent of Injury* on— | |
|---|---|---|
| | Bean | Corn |
| α-Tetralone: | | |
| 0.3 | 0 | 0 |
| 1.0 | 1 | 1 |
| 2-α-Naphthylmercaptocyclohexanone: | | |
| 0.3 | 0 | 0 |
| 1.0 | 1 | 1 |
| Benzalcyclopentanone: 1.0 | 1 | 1 |
| Tetrachlorocyclopentadienone dimer: | | |
| 0.3 | 0 | 0 |
| 1.0 | 0 | 0 |
| Hexachloroindone: | | |
| 0.3 | 0 | 0 |
| 1.0 | 0 | 0 |
| 3-Chloro-2, 4-pentanedione: | | |
| 0.3 | 0 | 0 |
| 1.0 | 0 | 1 |
| Cyclohexanone: | | |
| 1 | 0 | 0 |
| 10** | 0 | 0 |

*0=no effect; 1=slight effect; 2=moderate injury; 3=severe injury; 4=plant dead; 4a=leaves dried; 4b=leaves dropped.
**This was simply a 10% aqueous solution of the ketone.

*Example 2*

Another method of testing for herbicidal efficiency of a chemical involves noting the effects on seed germination and plant growth which may be evidenced by spraying soil surfaces. This test, commonly known as a "pre-emergence test" was conducted as follows:

Boxes having a 5" x 5" exposed area were partially filled with a layer of soil and 20 seeds were placed thereon and then covered with a ¼" to ½" layer of soil which had been screened to ¼" sieve. Test boxes containing 20 seeds each of radish, beet, mustard, morning glory and cheat grass seeds, respectively, were prepared. The surface soil of the seeded boxes was then sprayed, respectively, with the 1.0 per cent emulsion of Example 1. The quantity of emulsion which was applied was calculated to correspond to 50 lbs. of the mixture of cyclohexenyl and cyclohexylidene cyclohexanones per acre, 9.1 cc. of the 1.0 per cent emulsion per 25 sq. in. of surface soil being calculated to correspond to 50 lbs. of the chemical per acre. The sprayed boxes as well as similar seeded but unsprayed boxes were then maintained at standard conditions of temperature and watering for a period of two weeks. At the end of that time the number of healthy seedlings in each box was counted. Thus the number of non-emerging and damaged seedlings was obtained by difference. This difference is designated as "X." "Per cent phytotoxicity" was determined by the ratio of "X" to the number of healthy seedlings in the controls.

There was evidenced a 71–100 per cent phytotoxicity to cheat grass and a 0–20 per cent phytotoxicity to radish, beet, mustard and morning glory.

While the present ketones are most advantageously employed as herbicides by incorporating them into an aqueous emulsion as herein described, they may also be employed in other plant-destroying methods. Thus they may be incorporated into solid carriers such as clay, talc, pumice and bentonite to give herbicidal compositions which may be applied to living plants or to surfaces which are to be freed from plant growth. The ketones may also be mixed with liquid or solid agricultural pesticides, e. g., insecticides and fungicides. While solutions of the ketones in organic solvents may be employed for preventing and destroying plant growth, we have found that the emulsions possess an improved tendency to adhere to the treated surfaces and that less of the active ingredients, i. e., the ketones, is required to give comparable herbicidal efficiency.

What I claim is:

1. A herbicidal composition comprising an oil-in-water emulsion of a ketone selected from the class consisting of 2-(1-cyclohexenyl)cyclohexanone and 2-cyclohexylidenecyclohexanone, said ketone being present in said emulsion in a quantity which is toxic to plant life.

2. A herbicidal composition comprising an oil-in-water emulsion of the mixture of 2-(1-cyclohexenyl)cyclohexanone and 2-cyclohexylidenecyclohexanone obtained by self-condensation of cyclohexanone, said mixture being present in said composition in a quantity which is toxic to plant life.

3. A herbicidal composition comprising an oil-in-water emulsion of 2-(1-cyclohexenyl)cyclohexanone, said cyclohexanone compound being present in herbicidal composition in a quantity which is toxic to plant life.

4. A herbicidal composition comprising an oil-in-water emulsion of 2-cyclohexylidenecyclohexanone.

5. The method of destroying undesirable plants which comprises applying to said plants a toxic quantity of a herbicidal composition comprising a ketone selected from the class consisting of 2-(1-cyclohexenyl)cyclohexanone and 2-cyclohexylidenecyclohexanone.

6. The method of destroying undesired plants which comprises applying to said plants a toxic quantity of a herbicidal composition comprising a mixture of 2-(1-cyclohexenyl)cyclohexanone and 2-cyclohexylidenecyclohexanone obtained by self-condensation of cyclohexanone.

7. The method of destroying undesired plants which comprises applying to said plants a toxic quantity of a herbicidal composition comprising 2-(1-cyclohexenyl)cyclohexanone.

8. The method of destroying undesired plants which comprises applying to said plants a toxic quantity of a herbicidal composition comprising 2-cyclohexylidenecyclohexanone.

9. The method of preventing undesired plant growth which comprises applying to media normally supporting said growth a toxic quantity of a herbicidal composition comprising a ketone selected from the class consisting of 2-(1-cyclohexenyl)cyclohexanone and 2-cyclohexylidenecyclohexanone.

10. The method of preventing undesired plant growth which comprises applying to the surface of soils normally supporting said growth a toxic quantity of a herbicidal composition comprising a ketone selected from the class consisting of 2-(1-cyclohexenyl)cyclohexanone and 2-cyclohexylidenecyclohexanone.

No references cited.